(12) United States Patent
Junger

(10) Patent No.: US 6,834,268 B2
(45) Date of Patent: *Dec. 21, 2004

(54) METHOD AND APPARATUS FOR EFFICIENT HANDLING OF PRODUCT RETURN TRANSACTIONS

(75) Inventor: Peter Joseph Junger, Redmond, WA (US)

(73) Assignee: Nintendo of America, Inc., Kyoto (JP)

( * ) Notice: Subject to any disclaimer, the term of this patent is extended or adjusted under 35 U.S.C. 154(b) by 56 days.

This patent is subject to a terminal disclaimer.

(21) Appl. No.: 10/207,121

(22) Filed: Jul. 30, 2002

(65) Prior Publication Data

US 2002/0188531 A1 Dec. 12, 2002

Related U.S. Application Data

(63) Continuation of application No. 09/809,072, filed on Mar. 16, 2001, which is a continuation of application No. 09/494,540, filed on Jan. 31, 2000, now Pat. No. 6,269,344, which is a continuation of application No. 09/065,552, filed on Apr. 24, 1998, now Pat. No. 6,085,172, which is a continuation-in-part of application No. 08/725,259, filed on Oct. 2, 1996, now Pat. No. 6,018,719.

(51) Int. Cl.[7] .............................................. G06F 17/60
(52) U.S. Cl. ............................. 705/28; 705/14; 705/21; 705/22; 705/23
(58) Field of Search ............................ 705/28, 14, 21, 705/22, 23, 24

(56) References Cited

U.S. PATENT DOCUMENTS

| | | | |
|---|---|---|---|
| 789,106 A | 5/1905 | Seymour |
| 1,330,368 A | 2/1920 | Boos |
| 1,393,489 A | 10/1921 | Boos |
| 1,476,819 A | 12/1923 | Hope |

(List continued on next page.)

FOREIGN PATENT DOCUMENTS

DE 3 315 724 10/1984

(List continued on next page.)

OTHER PUBLICATIONS

John Longwell, Robec Links Its 18 Sales Facilities Via Newly Adopted NetWare System, Computer Reseller News, Sep. 6, 1993.*

(List continued on next page.)

*Primary Examiner*—Richard Chilcot
*Assistant Examiner*—J Harle
(74) *Attorney, Agent, or Firm*—Nixon & Vanderhye P.C.

(57) ABSTRACT

A method and apparatus for efficient handling of product returns to reduce associated costs. A computer system at a regional product return center scans a returned product for identifying information, accesses a manufacturer return approval computer system through the internet or the like, and then submits the identifying information to the manufacturer for return approval. The manufacturer computer system utilizes the identifying information to access an electronic registration database to determine whether the returned product satisfies applicable return criteria. If so, the product is approved for return to the manufacturer. The regional product return center preferably scans a plurality of returned products in a single session. In response to the product identifying information submitted by the regional product return center, the manufacturer provides a list of approved returns and unapproved returns, along with a return authorization number for the batch of approved returns. The regional product return center then assembles the approved product returns into a box, shipping pallet, or the like, applies a label indicating the return authorization label, and ships the batch to the manufacturer. Shipping costs can be saved by omitting rejected product returns from the shipment. The manufacturer can handle the approved product returns from the regional return center as a batch, thereby reducing costs.

8 Claims, 8 Drawing Sheets

U.S. PATENT DOCUMENTS

| | | | |
|---|---|---|---|
| 4,312,037 A | 1/1982 | Yamakita | |
| 4,414,467 A | 11/1983 | Gould et al. | |
| 4,458,802 A | 7/1984 | Maciver et al. | |
| 4,563,739 A | 1/1986 | Gerpheide et al. | |
| 4,598,810 A | 7/1986 | Shore et al. | |
| 4,668,150 A | 5/1987 | Blumberg | |
| 4,734,005 A | 3/1988 | Blumberg | |
| 4,750,119 A | 6/1988 | Cohen et al. | |
| 4,789,054 A | 12/1988 | Shore et al. | |
| 4,803,348 A | 2/1989 | Lohrey et al. | |
| 4,812,629 A | 3/1989 | O'Neil et al. | 235/383 |
| 4,814,592 A | 3/1989 | Bradt et al. | |
| 4,839,505 A | 6/1989 | Bradt et al. | |
| 4,858,743 A | 8/1989 | Paraskevakos et al. | |
| 4,866,661 A | 9/1989 | de Prins | |
| 4,871,054 A | 10/1989 | Murray | |
| 4,884,212 A | 11/1989 | Stutsman | |
| 4,893,705 A | 1/1990 | Brown | |
| 4,896,024 A | 1/1990 | Morello et al. | |
| 4,903,815 A | 2/1990 | Hirschfeld et al. | |
| 4,967,906 A | 11/1990 | Morello et al. | |
| 4,984,155 A | 1/1991 | Geier et al. | 364/401 |
| 4,997,076 A | 3/1991 | Hirschfeld et al. | |
| 5,007,518 A | 4/1991 | Crooks et al. | |
| 5,020,958 A | 6/1991 | Tuttobene | |
| 5,028,766 A | 7/1991 | Shah | |
| 5,042,686 A | 8/1991 | Stucki | |
| 5,133,441 A | 7/1992 | Brown | |
| 5,139,384 A | 8/1992 | Tuttobene | |
| 5,143,193 A | 9/1992 | Geraci | |
| 5,159,560 A | 10/1992 | Newell et al. | 364/479 |
| 5,216,612 A | 6/1993 | Cornett et al. | |
| 5,256,863 A | 10/1993 | Ferguson et al. | |
| 5,257,741 A | 11/1993 | Rode et al. | |
| 5,273,183 A | 12/1993 | Tuttobene | |
| 5,311,424 A | 5/1994 | Mukherjee et al. | |
| 5,375,240 A | 12/1994 | Grundy | |
| 5,478,990 A | 12/1995 | Montanari et al. | |
| 5,520,990 A | 5/1996 | Rotermund | 428/195 |
| 5,521,815 A | 5/1996 | Rose, Jr. | |
| 5,537,314 A | 7/1996 | Kanter | |
| 5,541,394 A | 7/1996 | Kouchi et al. | |
| 5,602,377 A | 2/1997 | Beller et al. | |
| 5,671,279 A | 9/1997 | Elgamal | 380/23 |
| 5,745,036 A | 4/1998 | Clare | |
| 5,799,285 A | 8/1998 | Klingman | |
| 5,804,803 A | 9/1998 | Cragun et al. | |
| 5,857,175 A | 1/1999 | Day et al. | |
| 5,895,453 A | 4/1999 | Cook | 705/22 |
| 5,918,214 A | 6/1999 | Perkowski | |
| 5,950,173 A | 9/1999 | Perkowski | |
| 5,984,508 A | 11/1999 | Hurley | |
| 6,014,635 A | 1/2000 | Harris et al. | |
| 6,029,139 A | 2/2000 | Cunningham et al. | |
| 6,029,141 A | 2/2000 | Bezos et al. | |
| 6,049,778 A | 4/2000 | Walker et al. | |
| 6,055,511 A | 4/2000 | Luebbering et al. | |
| 6,064,979 A | 5/2000 | Perkowski | |
| 6,085,167 A | 7/2000 | Iguchi | |
| 6,105,001 A | 8/2000 | Masi et al. | |
| 6,119,099 A | 9/2000 | Walker et al. | |
| 6,119,164 A | 9/2000 | Basche | |
| 6,134,533 A | 10/2000 | Shell | |
| 6,148,249 A | 11/2000 | Newman | |
| 6,154,738 A | 11/2000 | Call | |
| 6,219,652 B1 | 4/2001 | Carter et al. | |
| 6,222,914 B1 | 4/2001 | McMullin | |

FOREIGN PATENT DOCUMENTS

| | | |
|---|---|---|
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| JP | 02-139698 | 5/1990 |
| JP | 10188141 | 7/1998 |
| JP | 11066176 | 3/1999 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |

OTHER PUBLICATIONS

Nintendo Point of Purchase Mail–In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.
Software Maker Promises Many Happy Returns, Drug Topics, Mar. 4, 1996, vol. 140, No. 5, pp. 124–128.
Direct Return 2000, Software Overview, http://www.directreturn.com/software_overview.htm, Oct. 2, 2000.
Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.
PR Newswire, "CompuServe Introduces Electronic Product Registration Software", PR Newswire Association, Inc., Mar. 10, 1994, 2 pages.
Longwell, "Western Digital Wins—Price/performance gives driver marker victory margin", Computer Reseller News, CMP Publications, Inc., Jun. 28, 1993, 3 pages.
Grace, "ABCD Looks to Adopt EDI Transaction Sets", Computer Reseller News, CMP Publications, Inc., Jun. 28, 1993, 2 pages.
Discount Store News, "New Policy System can Par Suspect Returns, Cut Losses", Discount Store News, Lebhar–Friedman Inc., Jan. 1, 1996, 2 pages.
"Software Maker Promises Many Happy Returns", Drug Topics, vol. 140, No. 5, pp. 124–128 (Mar. 4, 1996).
Synchronics® User Manual: Point of Sale, Version 6.5, Apr. 1993 (ON 004464–ON 005116).
Synchronics® User Manual: Inventory Plus, Version 6.5, Apr. 1993 (ON 005117–ON 005892).
Collins, David Jarrett and Nancy Nasuti Whipple, Using Bar Code: Why It's Taking Over, Second Edition (ON 003696–ON 004031).
Birnbaum, Henry, General Information Manual: IBM Circulation Control at Brooklyn College Library, 29pp. (ON 001822–ON 001850.
White, Howard S., Library Technology Reports, Mar.–Apr. 1982, vol. 18,No. 2, pp. 178–184 (ON 001851–ON 001858).
Cooper, Michael D., Design of Library Automation Systems, pp. 83–109 (ON 1859–ON 001873).
Corbin, John, Developing Computer–Based Library Systems, pp. 144–149 (ON 001874–ON 001877).

DataPhase, Inc. Automated Circulation System, 43 pp. (ON 001878–ON 001904).
Dranov, Paula, Automated Library Circulation Systems, 1977–78, pp. 24–27 (ON 001905–ON 001929).
Hoadley, Irene Braden and A. Robert Thorson, An Automated On–Line Circulation System: Evaluation, Development, Use, 1973, 19 pp. (ON 001930–On 001948).
Meyer, James, "NOTIS: The System and Its Features", Library Hi Tech, Issue 10, vol. 3, No. 2, 1985, pp. 81–89 (ON 001949–ON 001959).
Dowlin, Kenneth E., "MAGGIE III: The Prototypical Library System", Library Hi Tech, Issue 16, vol. 4, No. 4, Winter 1986, pp. 7–15 (ON 001960–ON 001970).
Matthews, Joseph R., "Graphical User Interfaces GUI in Library Products", Library Technology Reports, vol. 32, No. 1, Jan. 1996, p. 53 (ON 001972–ON 001976).
Saffady, William, "Integrated Library Systems for Microcomputers and Mainframes: A Vendor Study", Library Techology Reports, vol. 30, No. 1, Jan. 1994, p. 5 (ON 001977–ON 002087).
Saffady, William, "Vendors of Integrated Library Systems for Minicomputers and Mainframes: An Industry Report, part 1", Library Techology Reports, vol. 33, No. 2, Mar. 1997, p. 161 (ON 002088–ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097–ON 002138).
Salton, Gerard, Dynamic Information and Library Processing, pp. 62–69 (ON 002139–ON 002143).
Grosch, Audrey N., Distributed Computing and the Electronic Library: Micros to Superminis, pp. 78–79 (ON 002144–ON 002146).
Reynolds, Dennis, Library Automation: Issues and Applications, pp. 42–49 and pp. 146–149 (ON 002147–ON 002153).
Salmon, Stephen R., Library Automation Systems, p. 239 (ON 002154–ON 002155).
Synchronics Software Product Information guide, 95 pages.
Direct Return 2000, Software Overview, http://www.directreturn.com/software_overview.htm, Copyright © 2000 Pharmacy Software Solutions, Inc.
Nintendo Point of Purchase Mail–In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.
"Retailing in Cyberspace", Narda News, Apr. 1995, pp. 21–22.
Deposition of Peter J. Junger, vol. 1 & 2 (Nov. 8–9, 2001) and Exhibits 1–4 & 8–19.
Deposition of Philip M. Rogers (Nov. 7, 2001) and Exhibits 1–19.
PR Newswire, "Escada Offers A Garden Variety For Spring", PR Newswire Association, Inc., Mar. 10, 1994, 2 pages.
Automotive News, " Reynolds, ADP differ on superhighway progress", Crain Communications, Inc., Apr. 11, 1994, 3 pages.
Computer Reseller News, "Case Study; Tapping The Channel's 'Best In Class'", CMP Publications, Inc., Jan. 30, 1995, 2 pages.
Rigney, "User Migrates to Windows NT", InternetWeek, CMP Publications, Inc., Jan. 10, 1994, 2 pages.

Business Wire, "Multimillion–dollar Health–care Products", Business Wire, Inc., Dec. 15, 1993, 2 pages.
Margulis, "Reclaim: an efficient way to handle damaged products", U.S. Distribution Journal, BMT Publications Inc., Mar. 15, 1992, 7 pages.
Jiji Press Ticker Service, "MITI Working Out Business Practice Guidelines", JiJi Press Ltd., Apr. 20, 1990, 1 page.
Jiji Press Ticker Service, "JCCI Issues Booklet to Explain Distribution", JuJi Press Ltd., Jul. 20, 1989, 1 page.
Business Wire, " Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.
LaPlante, "Rugby Darby; From proprietary host to a distributed LAN–based architecture in 2 years", InfoWorld, InfoWorld Media Group, Nov. 15, 1993, 4 pages.
Witt et al., "Distribution: a differentiator in 2000", Material Handling Engineering, Penton Publishing Inc., Oct. 1995, 15 pages.
Grotta, "Return to vendor: the right way to make mail–order returns", PC Sources, Information Access Company, a Thomson Corporation Company, ASAP Coastal Associates Publishing L.P., Feb. 1992, 10 pages.
Consumer Electronics, Warren Publishing, Inc., Consumer Electronics Personals, vol. 35, No. 6, p. 18.
Business Wire, "DataTrend receives award from AT&T Global Information Solutions", Business Wire, Inc., Nov. 7, 1995, 2 pages.
Quinn, "Why Wang took the third–party route", Information Access Company, a Thomson Corporation Company, ASAP Reed Publishing USA, vol. 30, No. 2, p. 30, Feb. 1991.
Rogers et al., "Going Backwards: Reversel Logistics Trends and Practices", Reverse Logistics Executive Council, 1998 (entire book).
IBM Systems Journal, vol. 14, No. 1, 1975, pp. 1–101.
CollegeTermPapers web page printout, "History of Fed Ex", www.collegetermpaper...rmPapers/Aviation/history_of_fed_ex.html (Aug. 24, 2001), 7 pages.
Rosenbloom, "Midnight Express", Inc., Jul. 2001, 4 pages.
Sleeper, "FedEx Pushes The Right Buttons to Remain No. 1 In Fast Shipping", Investor's Business Daily, May 25, 2001, 2 pages.
Brewin et al., "Follow That Package!", Computer World, vol. 35, No. 12, Mar. 19, 2001, 4 pages.
Joachim, "FedEx Delivers On CEO's IT Vision", InternetWeek, Oct. 25, 1999, 4 pages.
Federal Express Information Packet, 56 pages (incl. cover and table of contents).
Sigafoos et al., "Absolutely Positively Overnight!: The Unofficial Corporate History of Federal Express", St. Luke Press, 1988, pp. 1–22.
Witt, "How To Master The Art of Returns: Automation Is The Key", Material Handling Engineering, Jun. 1994, pp. 58–60.
Dilger, "The Other Direction", Manufacturing Systems, vol. 15, No. 10, pp. 12–13 (Oct. 1997).
"Computer City Moves to Consolidate Returns", Computer Retail Systems, vol. 6, No. 125, Jan. 22, 1998, 2 pages.
Dreamcom web page printout, www.dreamcomdirect.com/RMA.htm (May 25, 1997).

* cited by examiner

METHOD AND APPARATUS FOR EFFICIENT HANDLING OF PRODUCT RETURN TRANSACTIONS

This application is a continuation of application Ser. No. 09/809,072, filed Mar. 16, 2001, pending, which is a continuation of Ser. No. 09/494,540, filed Jan. 31, 2000, now U.S. Pat. No. 6,269,344, which is a continuation of Ser. No. 09/065,552, filed Apr. 24, 1998, now U.S. Pat. No. 6,085,172, which is a CIP of Ser. No, 08/725,259, filed Oct. 2, 1996, now U.S. Pat. No. 6,018,719 the entire content of which is hereby incorporated by reference in this application.

BACKGROUND OF THE INVENTION

1. Field of the Invention

The present invention relates to a method and apparatus for efficient handling of product return transactions. More particularly, the present invention relates to a technique which permits a manufacturer or distributor of commercial products to quickly and inexpensively handle product returns while ensuring that the returned product satisfies applicable criteria for return.

2. Related Art

Product returns are a market reality faced by virtually every manufacturer, distributor, supplier or retailer of commercial products. Unfortunately, handling product returns often requires a significant expenditure of resources. For example, it may be necessary to employ one or more individuals to verify that product returns satisfy the requirements of a company's return policy. Alternatively, a company might choose to avoid the increased overhead associated with additional employees and be somewhat less diligent about verifying compliance with the return policy. However, this alternative can increase costs due to the higher number of improper product returns. Either way, additional costs must either by borne by the company or passed along to the consumer.

In addition to the costs associated with verifying compliance with a return policy, even proper product returns incur additional administrative costs. Examples of such costs include shipping and handling of the returned product, repackaging and redistribution of the returned product (if appropriate), disposal of certain returned products, and the like. These costs must also be borne either by the company or by the consumer in the form of higher prices.

It is, of course, desirable to minimize costs associated with product returns to permit reduced prices to the customer and/or provide improved operating margins for the manufacturer and/or the retailer. There are two major areas in which savings may be realized: (1) reducing the number of improper or fraudulent returns; and (2) improving efficiency and reducing overhead in handling proper returns.

One technique for reducing improper returns is disclosed in commonly owned, co-pending U.S. patent application Ser. No. 08/725,259, filed Oct. 2, 1996, in the names of Philip M. Rogers and Peter J. Junger, which is hereby expressly incorporated by reference in its entirety. Briefly, that application discloses an electronic system for registering product transactions to facilitate compliance with return policies and to reduce improper or fraudulent product returns under warranty. Such an electronic registration system enables individual product identification information to be gathered at the point of a transaction for inclusion in one or more transaction databases. Individual product identification information (such as a serial number) may be stored in a local transaction database along with additional information including at least the date of the transaction. A transaction receipt, such as a customer sales receipt which includes the individual product identification information and the date of the transaction, can be created. Additionally, the individual product identification information and the transaction date may be communicated to a separate location for inclusion in a general transaction database.

Where a serial number is used to identify the individual product, a check digit is preferably used in conjunction with the serial number. In this way, the validity of the serial number can be verified and, if it is invalid, a retail sales clerk or other system operator is prompted to re-enter the serial number. The serial number may be scanned, entered with a keypad, or input with any other suitable technique.

When a customer returns a product with a receipt, a retailer may note the serial number appearing on the receipt and compare it to the returned product. If the serial numbers match and all other return conditions are met, the return may be accepted. When a customer returns a product with no receipt, or a receipt that does not have a correct serial number, the retailer may search the local database for sale information concerning the specific item being returned. If no sale information is located (for instance if another retailer sold the product), the general database may be accessed and searched for sales information, and the return handled accordingly.

This system is helpful in reducing improper or fraudulent product returns and, thus, in reducing costs associated with such returns. Additionally, by reducing the number of improper product returns and automating various product return functions, handling costs associated with product returns are likewise reduced. However, there continues to be a need to further reduce product return costs, particularly costs relating to processing proper product returns. Accordingly, it is a primary object of the present invention to provide a method and apparatus for efficient handling of product return transactions which reduces costs while ensuring against improper product returns.

BRIEF SUMMARY

In accordance with one aspect of the present invention, a computer system at a product return center location obtains identifying information for a product which is to be returned. In the disclosed example implementation, this identifying information is then submitted to a remote return approval computer system through the internet or the like. The return approval computer system may then utilize the identifying information to determine whether the returned product satisfies applicable return criteria. If so, the product is pre-approved for return. The product return location preferably obtains identifying information for a plurality of returned products at a time. In response to the product identifying information submitted by the product return location, the return approval location may provide a list of approved returns and unapproved returns, alone with a return authorization number for a batch of approved returns. The product return location may then assemble the approved product returns and ship the batch to the return approval location. Shipping costs can be saved by omitting rejected product returns from the shipment. The return approval location can handle the approved product returns from the regional return center as a batch, thereby reducing costs.

BRIEF DESCRIPTION OF THE DRAWINGS

Various objects, features, characteristics and advantages of the present invention will be more completely understood and appreciated by careful study of the following more detailed description of a presently preferred exemplary embodiment of the invention when read in view of the accompanying drawings, wherein:

FIGS. 4A through 4H illustrate various user interface screen displays which may be used in connection with an example implementation of the present invention;

DETAILED DESCRIPTION OF A PREFERRED EMBODIMENT

The present invention is described in the context of a particular exemplary embodiment. However, it will be recognized by those of ordinary skill that modification, extensions and changes to the disclosed exemplary embodiment may be made without departing from the scope and spirit of the invention. For instance, although the invention is described primarily in the context of a retailer/manufacturer product return situation, the features, characteristics and advantages of the present invention could likewise be applied to a store headquarters situation, a retailer/distributor situation, or a distributor/manufacturer situation. Also, it should be appreciated that the term "manufacturer" is used in a broad sense and may include, for example, a supplier of goods that are sold under the supplier's label, but are manufactured by another company on behalf of the supplier. In short, the present invention is not limited to the particular forms disclosed.

Figure 1:
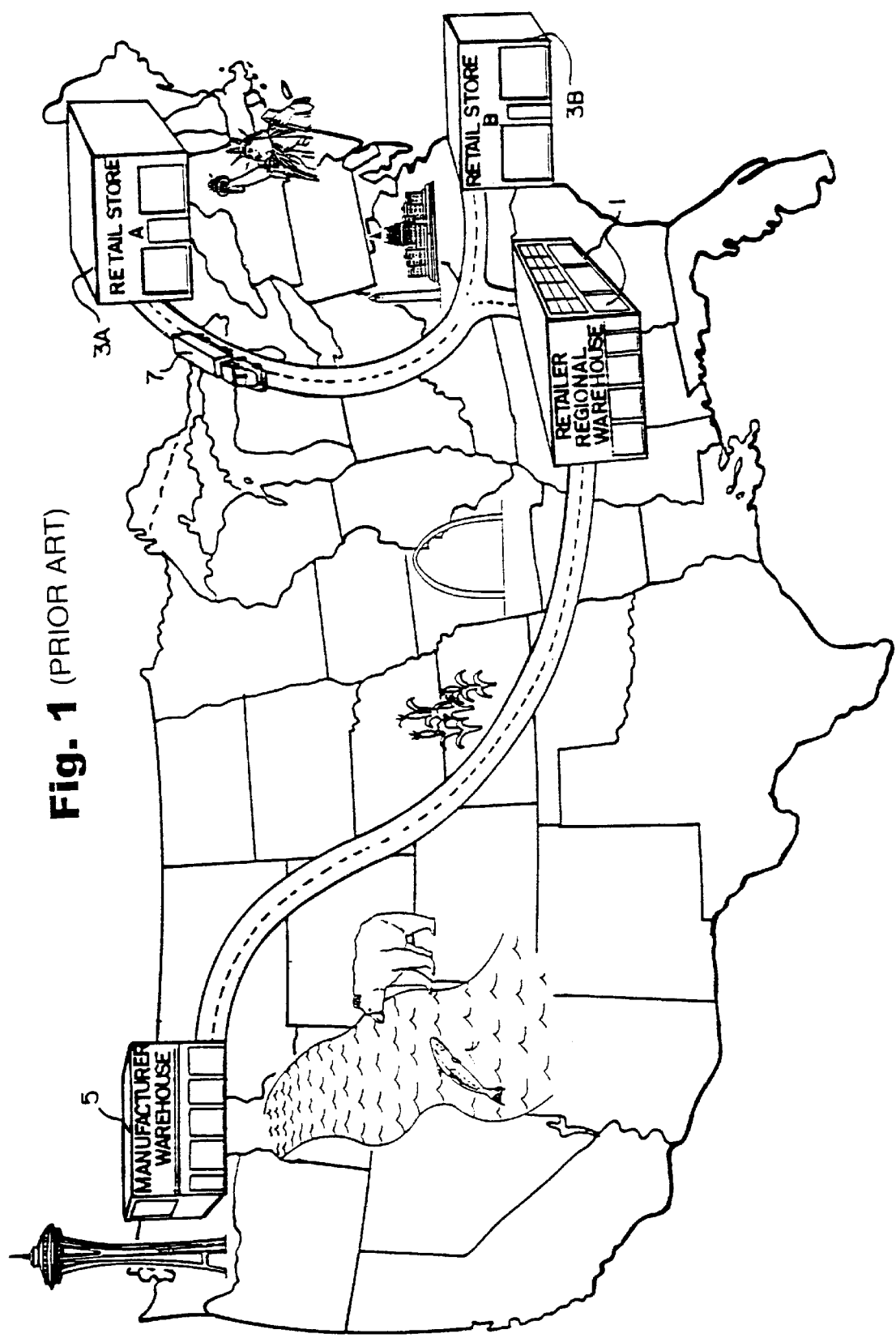
FIG. 1 schematically illustrates a typical arrangement utilized in handling product returns.

Referring now to FIG. 1, an example of a typical arrangement for handling product returns is illustrated. The present invention, of course, is applicable to other arrangements as well. In the example arrangement of FIG. 1, a regional warehouse 1 operated by a large retail chain collects product returns from local retail stores 3A and 3B. In the illustrated example, retail store 3A is located in the Northeast United States and retail store 3B serves the mid-Atlantic region; the retailer regional return center warehouse 1 is located in the South; and the manufacturer warehouse 5 is in the Pacific Northwest. Of course, this example is for illustrative purposes only, and it should be appreciated that other local retail stores, regional return centers, etc. would be present in an actual return network. Also, it should be understood that a product return network typically would be operated in conjunction with a product distribution network.

After the returned products arrive at the regional warehouse 1, they are sorted by manufacturer and/or product, and are shipped from the regional warehouse 1 to the manufacturer warehouse 5 for credit or replacement. The manufacturer then inspects the returned products to ensure that they comply with necessary return conditions and, if appropriate, issues a credit or replacement product.

Each step of the foregoing example return process involves various processing and handling requirements. For example, personnel at the local retail store must first review the product for compliance with applicable return requirements (e.g., ensure that the product is returned within the specified return period and verify that all parts have been returned), and then arrange for shipment to the appropriate regional warehouse by way of a truck 7 or other suitable means of transportation.

Employees at the regional warehouse must unload the products received from the local retail stores, sort them by manufacturer and/or product, prepare them for shipment (e.g., place the returned products on shipping pallets). and arrange for the shipment to the manufacturer. Finally, the manufacturer must receive the returned product shipment, verify that the returns are proper, repackage the returned products if appropriate, and conduct necessary bookkeeping to ensure that the retailer receives proper credit for the return. It is noted that the foregoing is not an exhaustive list of the costs and efforts associated with processing product returns by the retail stores, the regional return center warehouses, and the manufacturers.

The present invention may be utilized, for example, in connection with operations at the retailer regional return center warehouse 1 to reduce costs incurred by both the return center and the manufacturer. In accordance with one aspect of the present invention, significant cost savings can be realized by reducing or eliminating unnecessary shipping costs by making a relatively early determination whether a product return will ultimately be accepted by the manufacturer or the like. If not, the returned product need not be handled further, thereby reducing costs.

In accordance with another aspect of the present invention, advance return authorization may be obtained for a plurality of products at one time to establish an approved product return batch. The approved batch may be properly labeled prior to return to the manufacturer. In this way, product returns may be easily and efficiently handled in batches rather than as individual units, thereby improving efficiency and reducing costs.

Figure 2:
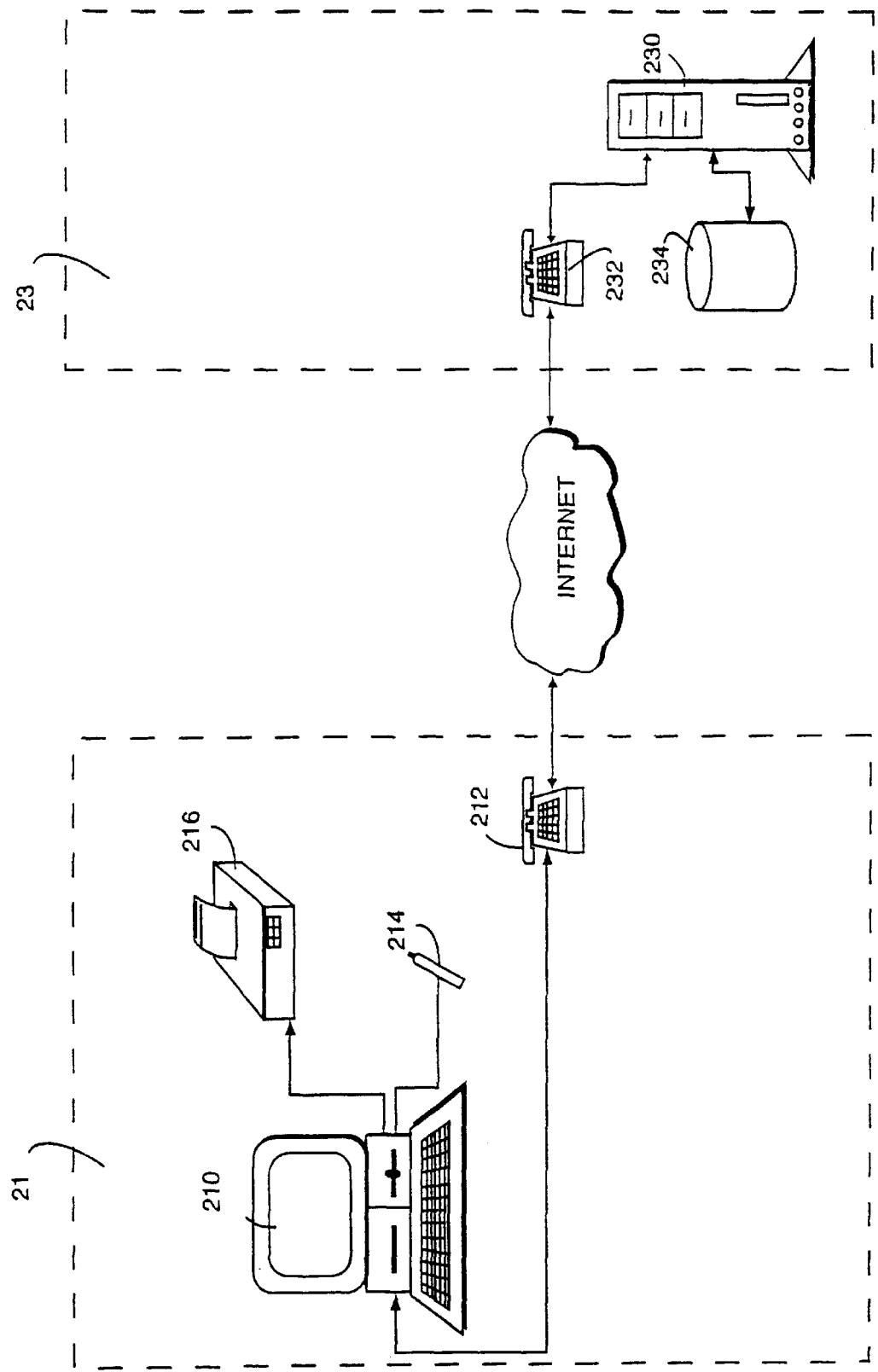
FIG. 2 is a schematic diagram illustrating components which may be used in connection with a preferred example implementation of the present invention.

Referring now to FIG. 2, an example implementation of the present invention includes a return side portion 21 and a manufacturer side portion 23 which are operable to communicate over an internet connection 25. Briefly, the return side portion 21 may include a personal computer 210 that includes, for example, an Intel 486 processor or higher with at least 16 MB of RAM, a Microsoft Windows 95 or Windows NT operating system, and browser software such as Netscape Navigator 4.0 or higher. The personal computer may also include a modem for direct connection to an internet provider through a dedicated telephone connection 212. Alternatively, an internet connection may be made by the personal computer 210 over a corporate network. Also, it may be possible to utilize a direct telephone link by modem between the return side portion 21 and the manufacturer side portion 23 or even a hardwired connection.

A bar code scanner 214 is provided for scanning bar coded SKU and, possibly, serial numbers for returned products. Additionally, a printer 216 is provided for printing transaction records and, if desired, printed versions of return authorizations from the manufacturer. As will be discussed below in greater detail, manually prepared return authorization forms may be used as an alternative to printed return authorizations.

The manufacturer side portion 21 includes a computer system 230 utilizing, for example, an IBM AS/400 computer and having an associated data storage unit 234 for storing an electronic product registration database. The manufacturer side computer system 230 is capable of communicating with the return side portion 21 over an internet connection though telephone connection 232. As noted previously, other communication techniques between the manufacturer side portion 23 and the return side portion 21 may also be utilized.

After the regional retailer return facility receives products for return to the manufacturer, the return side portion 21 may access the manufacturer side portion 23 to screen the products for compliance with return requirements and to obtain pre-authorization of the returns. In particular, the return side computer 210 connects to the manufacturer side computer 230 by way of the internet or through other appropriate communication techniques. In the present example embodiment, the manufacturer side computer maintains a world wide web page for access by the regional return center. Password protection may be provided to ensure only authorized retailers are able to access return pre-authorization features in accordance with the present invention. For example, each return center location that is permitted access to the pre-authorization features may be assigned a location identification code and a password. In such a case, both the location identification code and the password would be required before access is granted to the product return screening program.

Figure 3:
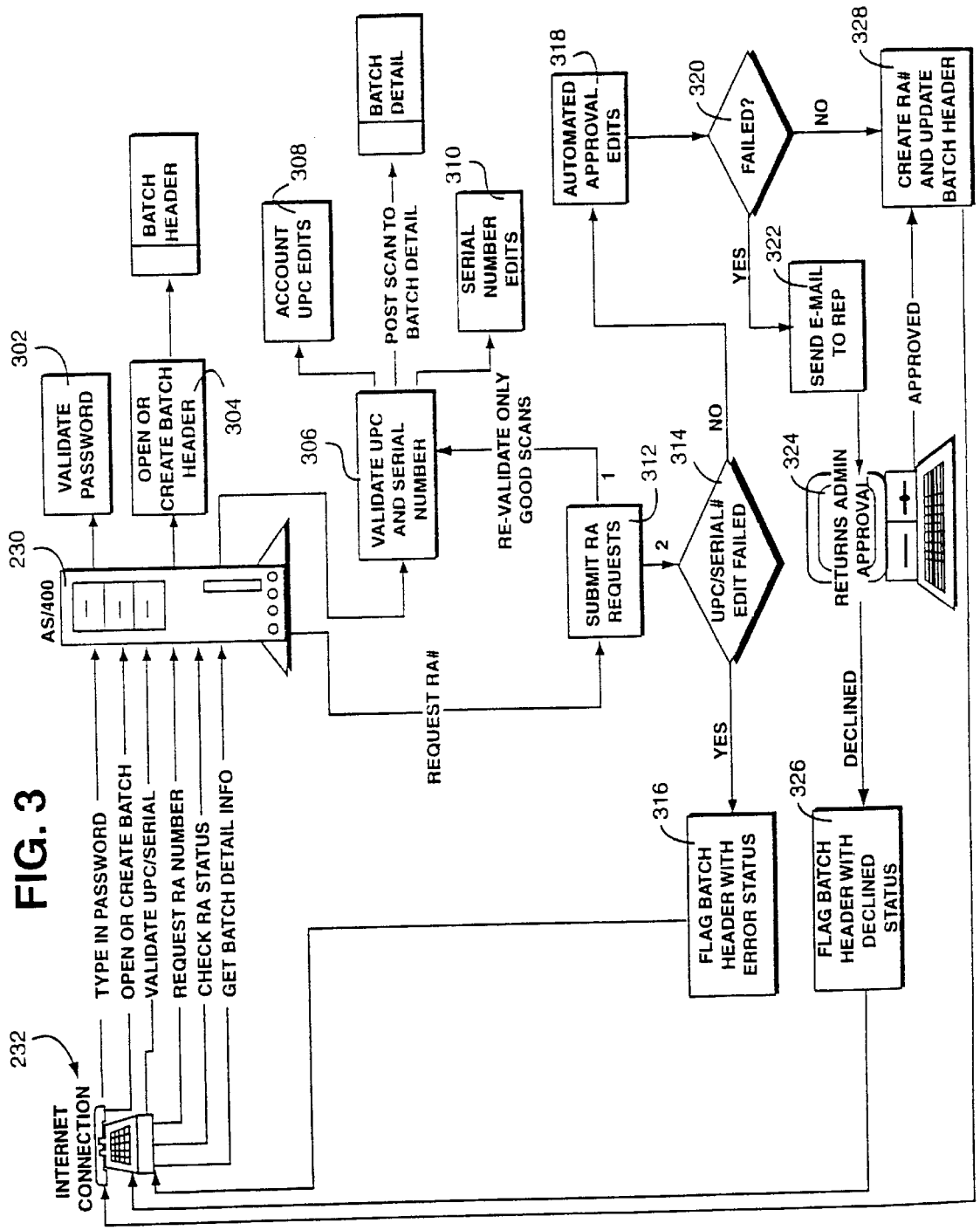
FIG. 3 is a data flow diagram illustrating operation of the system of FIG. 2.
Figure 4A:
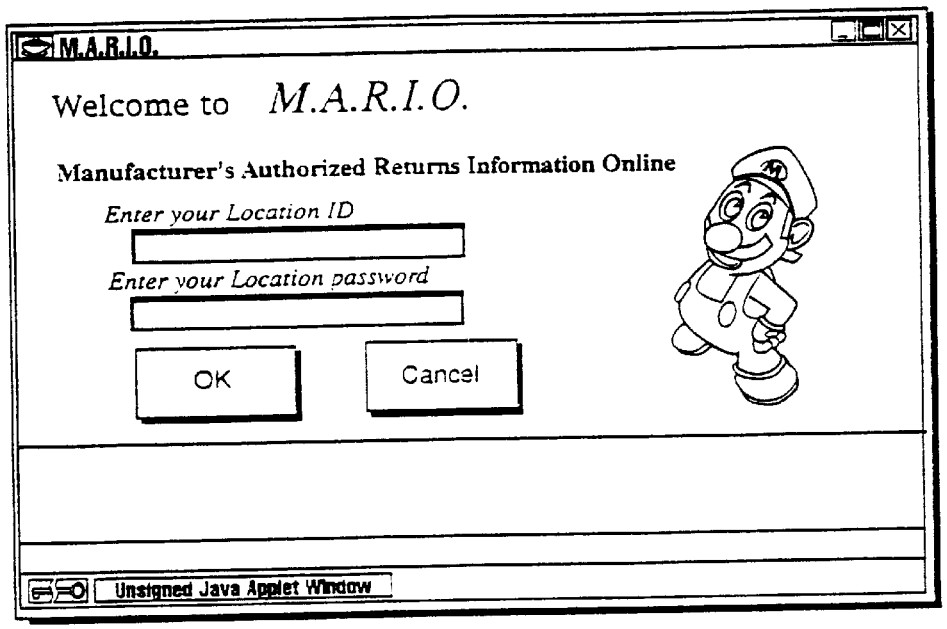

FIG. 3 is a logic flow chart for the manufacturer side computer 230 in screening returned products and processing pre-authorization requests from the regional return center. As indicated in the top portion of FIG. 3, the user first enters the appropriate location identification code and password. FIG. 4A illustrates a screen which may be displayed at the return side computer to prompt the user to enter the location identification and password. Once this information is received by the manufacturer side computer, the password is validated at function block 302. If desired, appropriate application maintenance procedures may be implemented upon validation of the password.

Figure 4B:
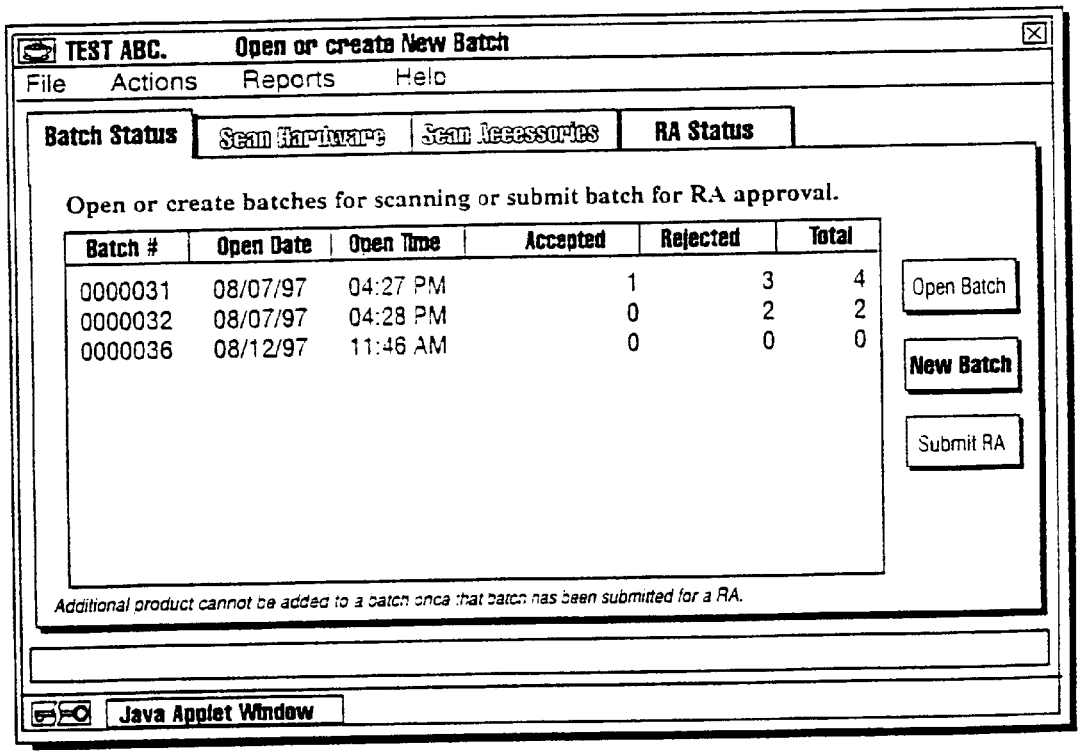

Upon verification of the location identification code and the password, the manufacturer side computer 230 may cause a screen such as is illustrated in FIG. 4B to be displayed at the return side computer 210. As shown in FIG. 4B, existing batches saved in memory at the manufacturer side computer 230 are listed. Existing batches are those for which return products have been scanned, but which have not yet been submitted for return authorization. Preferably, items can only be added or deleted from a batch up to the time that the batch is submitted for return authorization. In the present example implementation of the invention, once the batch is submitted for return authorization, it will no longer be displayed on the batch status screen, but can be viewed from the RA Status screen described below in connection with FIG. 4H.

It is possible to display a number of information items on the batch status screen in addition to the batch number. For example, the batch status screen shown in FIG. 4B displays the date and time the batch was opened, the total number of products that have been screened for return validation, the number of accepted items, and the number of rejected items. Of course, additional information could be displayed if desired A number of options are offered to the return center operator on the batch status screen illustrated in FIG. 4B. In particular, the return center operator may open an existing batch, create a new batch, or submit a batch to the manufacturer for return authorization. To open an existing batch, the desired batch may be selected in a conventional fashion by using a mouse to highlight the batch number and then clicking on the "Open Batch" button. Similarly, a highlighted batch may be submitted for return authorization by clicking the "Submit RA" button. A new batch can be created by clicking the "New Batch" button.

A batch must be set up prior to screening returned products for return authorization. Depending on user preference, the return center operator may establish a new batch for each pallet of returned products that is screened for return authorization, each bill of lading, or based on the date that the products are scanned. It is not necessary to limit the number of products that can be scanned for each batch.

Referring again to FIG. 3, when the return center operator either opens an existing batch or creates a new batch, control passes to function block 304. For a new batch, the manufacturer side computer 230 creates a batch header which includes information identifying the assigned batch number, any customer reference numbers, the return center address, the name and telephone number of a customer contact person, and the status of the batch (e.g., product entry stage, pending approval, approved, declined, RA assigned, etc.). A new batch number will be assigned each time "New Batch" is selected. If an existing batch is opened, the header information is retrieved from memory associated with the manufacturer side computer 230.

Once a batch is opened, the system is now ready to screen returned products. Depending on the type of product for which return authorization is sought, the return center operator selects either "Scan Hardware" or "Scan Accessories" by clicking the appropriate button (FIG. 4B).

Figure 4C:
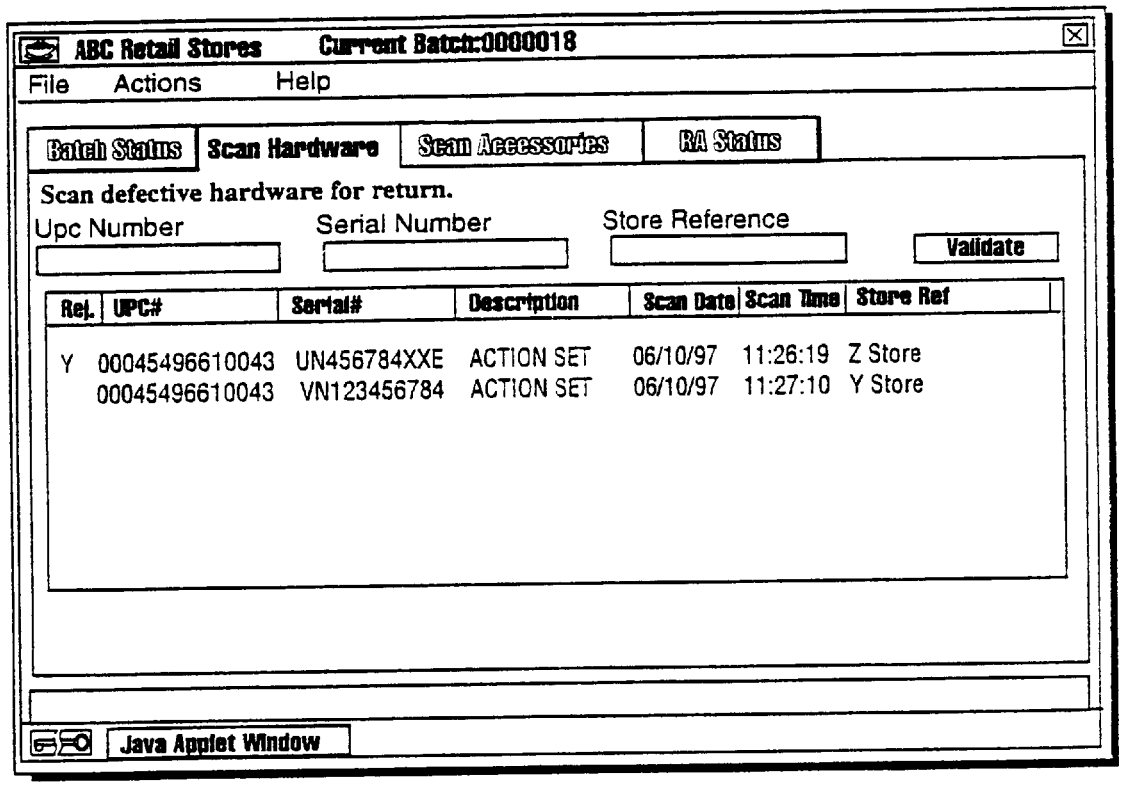

Referring now to FIG. 4C, to screen hardware product returns for compliance with return criteria, the return center operator is prompted to enter the Universal Product Code (UPC) number for the product, the product serial number, and a store reference code (if desired). This information may be entered by scanning bar codes on the product with wedge scanner 214 (FIG. 2), or alternatively by typing the information on the keyboard associated with return side computer 210. Other appropriate techniques may be employed as well. The user may then click the "Validate" button to instruct the manufacturer side computer 230 to screen the product for return approval.

As shown in FIG. 4C, the Scan Hardware screen then displays the submitted information including the UPC code, the serial number, a description of the product, the date and time it was entered, and the store reference if any. Again, other items could be displayed if desired.

Although various techniques may be used for validating the screened products for compliance with return criteria, the electronic registration system disclosed in the previously identified co-pending U.S. patent application Ser. No. 08/725,259, filed Oct. 2, 1996, is preferred for use in connection with the present invention. Briefly, such an electronic registration system establishes a database which then may be accessed at the time of product return to determine the date of original sale and other information pertinent to determining whether return requirements are met.

When the manufacturer side computer 230 receives UPC and serial number information for return validation, control passes to function block 306 of FIG. 3. The manufacturer side computer 230 then checks the electronic registration database to ensure that the identified product meets product return criteria, and posts the scanned information to a batch detail file. The batch detail file preferably includes the UPC number, the serial number, an indication of product quantity, and status (e.g., pending approval, approval good, error, or approval declined). The electronic registration database may then be edited to indicate that the product identified by the UPC code (function block 308) and serial number (function block 310) has been screened for return. Accordingly, the manufacturer side computer 230 can keep track of products that have already been screened to avoid multiple submissions of a single product for return.

There may be a number of reasons a hardware system will not qualify for return credit or replacement. For example, the warranty period may have expired, the serial number might not have been registered, an invalid serial number may have been received, the packaging may be missing, a major component of the product may be missing, or the item might be non-returnable as part of the conditions of sale. If the product does not qualify for return, the return center can retain the rejected product rather than ship it to the manufacturer, thereby saving the cost of freight for shipping a product that does not qualify for credit.

Figure 4D:
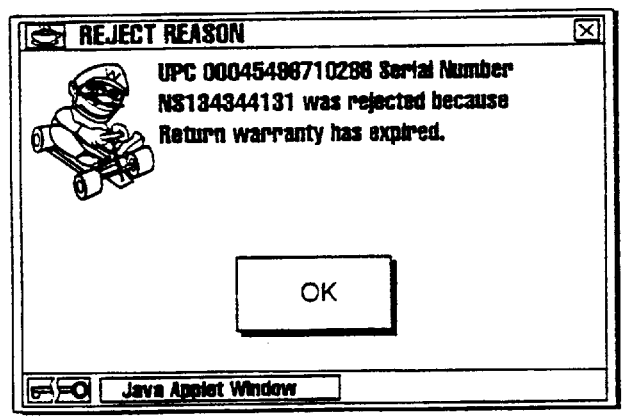

A note is displayed across the bottom of the screen of the Scan Hardware screen when a hardware unit does not qualify for return. The displayed message is preferably for the last item scanned. If the return center operator would like to review the reason a previously scanned item did not qualify for return credit, the operator may select "Actions" from the screen menu to see a list of available options. The operator may then select "Reasons" to see a description of the reason the unit was rejected. An example of a displayed reject reason is shown if FIG. 4D. Scanning may be resumed by pressing the <Esc> key on the return side computer keyboard to close the menu screen. The scanning process is repeated for each hardware item for which screening is sought.

Ideally, the return center operator stacks items qualifying for return on a shipping pallet or the like. Non-qualifying items should be stacked on a separate pallet. It will then be unnecessary for return center personnel to later sort through the products a second time to separate qualifying products from non-qualifying products.

Figures 4E, 4F:
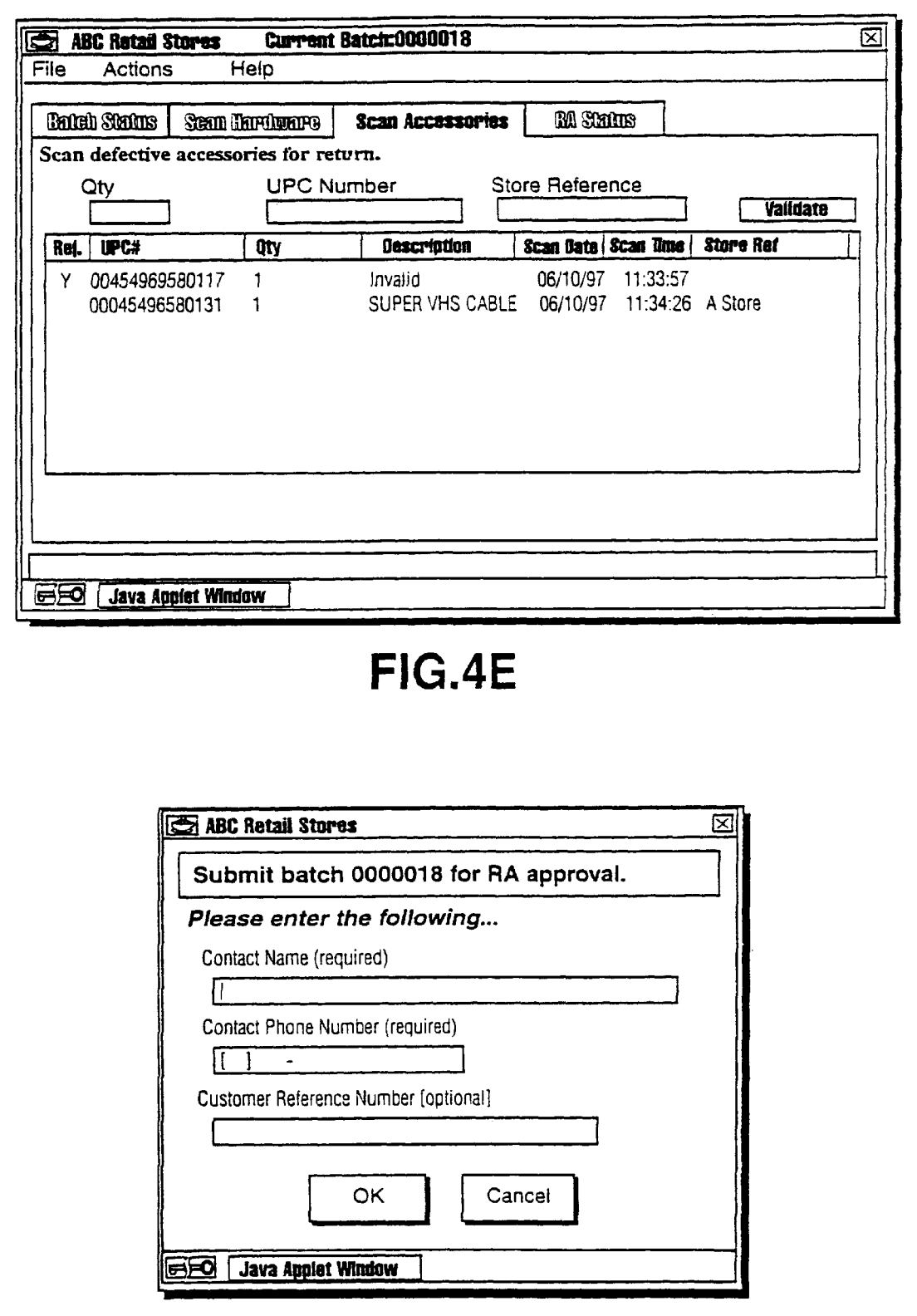

The Scan Accessories display screen is illustrated in FIG. 4E. The return center operator is prompted to enter the quantity of the accessory that is to be scanned. For example, if return authorization is to be requested for three VHS cables, the operator will input "3" and then use the <TAB> button on the return side computer keyboard to advance the cursor to the UPC Number field. The UPC number may then be scanned or entered manually on the keyboard. If a Store Reference code is used it may be entered prior to clicking the "Validate" button.

Once pre-screening is completed for the hardware and accessories, the return center operator may move back to the "Batch Status" screen. The batch may then be submitted for return authorization by clicking the "Submit RA" button. Referring now to FIG. 4F, the return center operator is preferably prompted to enter the name and phone number of the person who should be contacted with information or questions concerning the return authorization request. If desired, a customer reference number (e.g., a bill of lading number, file number, invoice number, etc.) may be entered for an internal reference to identify the return authorization. If the information on the screen is not filled in or "Cancel" is selected, the batch will not be submitted for return authorization. However, the batch will continue to be visible from the "Batch Status" screen.

Figure 4G:
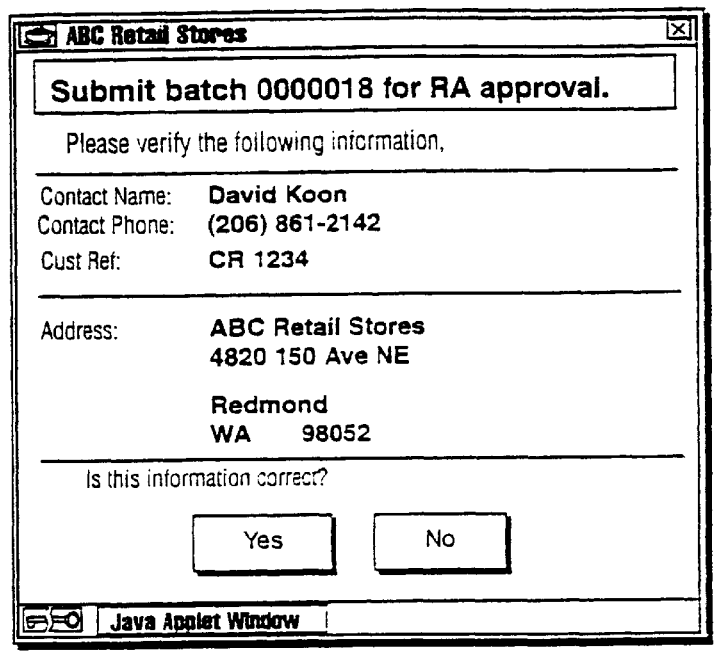

Referring again to FIG. 3, control goes to function block 312 upon submission of a return authorization request. First, the return center operator is asked to verify the contact information. An example of an appropriate contact verification screen for display on the return side computer 210 is shown in FIG. 4G. If the contact information is verified, the manufacturer side computer 230 re-validates the good scans included in the submitted batch. Control then proceeds to function block 314. If the good scans fail re-validation, control proceeds to function block 316, which flags the batch header with an error indication, and notifies the return center operator of the failure. Otherwise, control proceeds to function block 318 for automated approval.

Function block 320 checks to determine whether the automated approval process was successful. If not, an e-mail message may be sent to a manufacturer's representative for the particular return center (function block 322). The return authorization request may then be reviewed manually to determine whether the request should be approved (function block 324). If the manual review shows that the request was properly rejected, the batch is flagged with an indication that the request was rejected, and the return center is notified of the rejection (function block 326). However, if the request is approved, control passes to function block 328 to create a return authorization number and update the batch header to indicate the approved status. As indicated in FIG. 3, control may also pass to function block 328 by way of function block 320 if the automated approval process is successful.

Figure 4H:
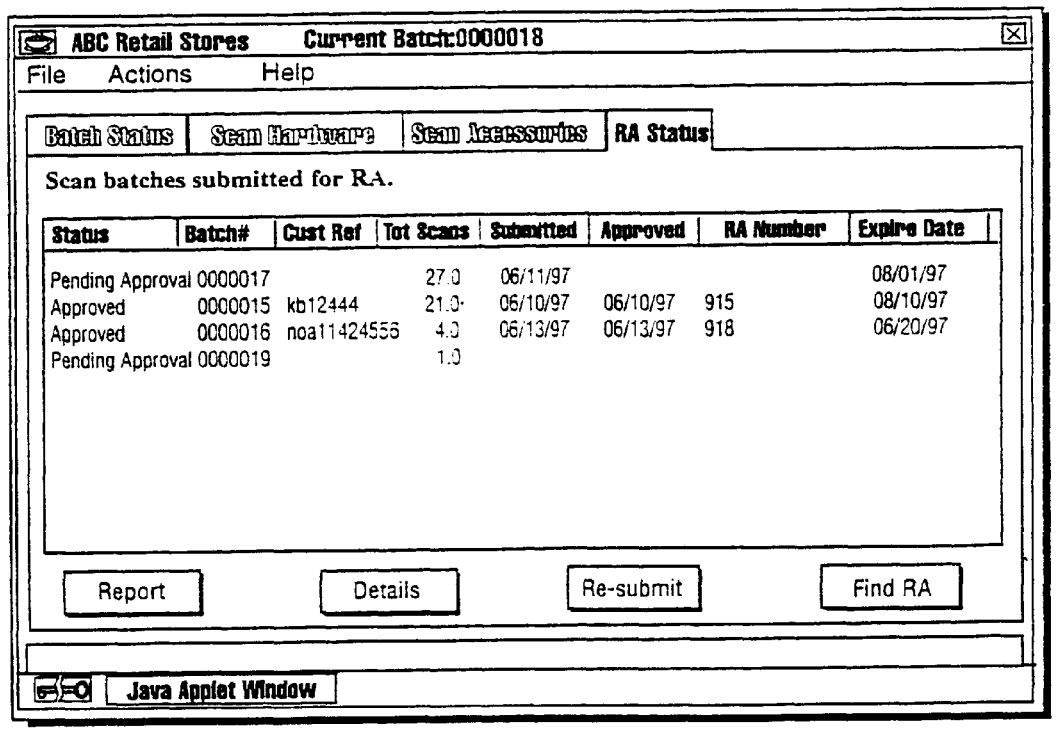

FIG. 4H illustrates an example of an RA Status display screen which may be used to inform the return center operator of the status of a return authorization request. As shown, the RA Status screen lists the authorization status (e.g., pending, approved, rejected), the batch number, the customer reference number if any, the number of scans in the batch, the submission date, the approval date if applicable, the RA number if applicable, and the expiration date by which the return must be completed.

Once the RA has been submitted and approved, the system may also provide the dollar value of the product that is authorized for return. This dollar value may be based on the lower of 1) the gross invoice price paid by the Dealer for the product, less the value of all allowances and incentives given to the Dealer, or 2) the vendor's net product pricing at the time of the return. In most cases, the dealer may deduct the monetary value of authorized returns from any existing or future vendor invoices. Additionally, the system can be configured to comply with a vendor's specific returns policy and guidelines.

Figure 5A:
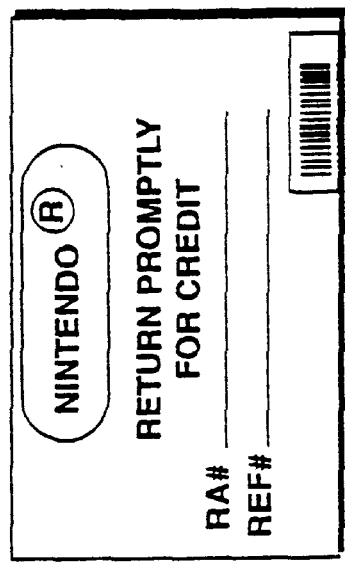
FIG. 5A further illustrates the batch return authorization label of FIG. 5.
Figure 5:
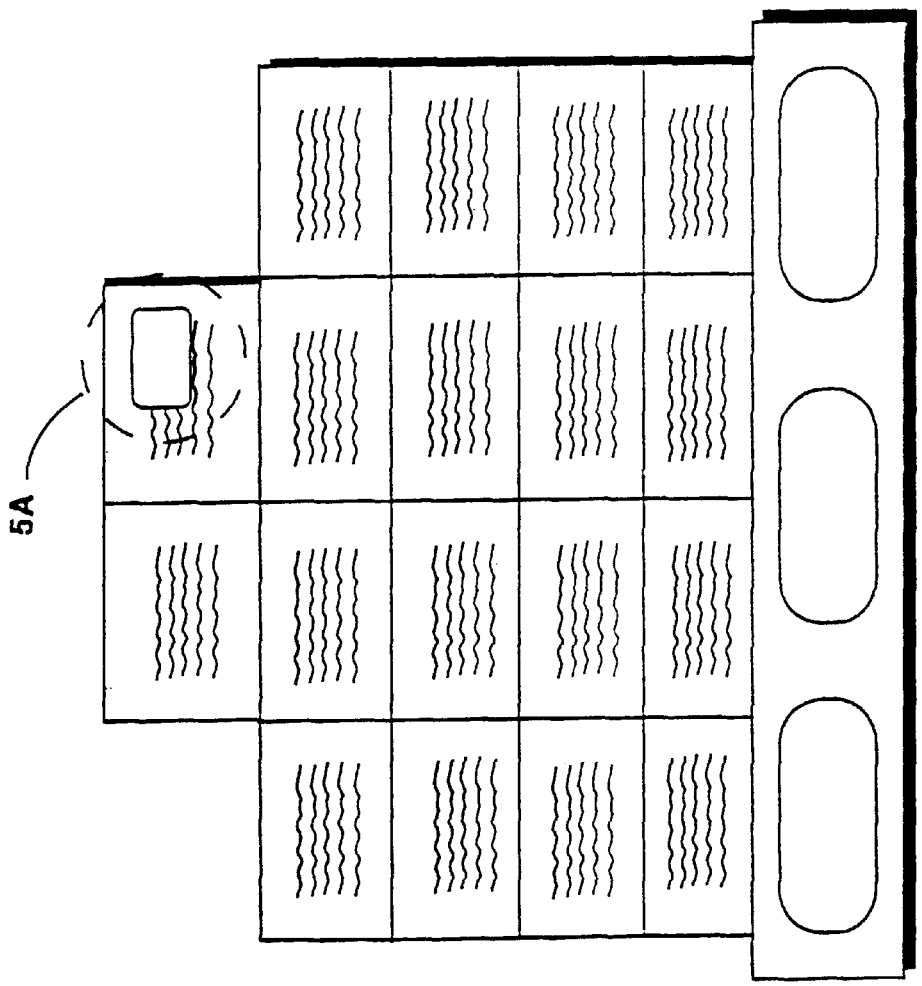
FIG. 5 is a plan view of a pallet on which a plurality of returned goods is stacked for return to a manufacturer, including a batch return authorization label which may be placed on the pallet.

The RA number should be placed on the products prior to shipping to the manufacturer for credit. Referring now to FIGS. 5 and 5A, the RA number listed on the RA Status display screen may be written on an adhesive label supplied by the manufacturer alone with the customer reference number (if applicable). Alternatively, the printer 216 (FIG. 2) may be used to print labels upon receipt of a return authorization number. Such labels are preferably placed on all four sides of the shipping pallet, the pallet is shrink wrapped and shipped to the manufacturer. The pallet should be shipped immediately to guard against expiration of product return dates. Of course, other shipping containers may be used as well.

The return authorization labels provide an easy reference to personnel at the manufacturer warehouse and permit simple and efficient processing of the returned. Because the returned products are received in a batch and have been pre-approved for return credit, less work is required in reviewing the returned products to verify compliance with return criteria. As a result, the resources required to process the shipment are reduced, and the manufacturer is able to more quickly credit the return center for the returned products.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electronic system for obtaining remote pre-approval for returns of uniquely identified products from a first location to a second location, comprising:

an electronic database system containing information on the uniquely identified products and vendor return criteria for the products, said electronic database system being remotely located from the first location;

an information processing system located at the first location and operable to obtain a unique product identifier from a product sought to be returned, said information processing system being operable to transmit the unique product identifier to the electronic database system;

wherein the electronic database system is operable to determine whether the product qualifies for return based on the unique product identifier and the return criteria and to provide to the information processing system a return qualification indicator if the product qualifies for return.

2. An electronic system as defined in claim 1, wherein the information processing system enables a unique product identifier to be obtained for a plurality of products, and the electronic database system is operable to determine whether each of the plurality of products qualifies for return based on each unique product identifier and the return criteria, and to provide to the information processing system a return qualification indicator for each product if the product qualifies for return.

3. An electronic system as defined in claim 2, wherein the information processing system further includes a display which is operable to display the return qualification indicator for each product.

4. An electronic system as defined in claim 3, wherein the information processing system further enables a plurality of products for which unique product identifiers have been obtained to be grouped as a batch of products and to have the unique product identifiers for the batch transmitted to the electronic database system as a batch.

5. An electronic system as defined in claim 4, wherein the information processing system enables a plurality of batches of products to be defined, and further wherein the electronic database system processes each of the defined batches as a batch when determining whether the products in each batch qualifies for return.

6. An electronic system as defined in claim 5, wherein the information processing system enables status information on each of the plurality of batches of products to be viewed on the display.

7. An electronic system as defined in claim 1, wherein the electronic database system enables a return pre-authorization to be obtained which pre-authorizes a return of the product from the first location to the second location.

8. An electronic system as defined in claim 6, wherein the electronic system enables a return pre-authorization to be obtained for each of the plurality of batches of products which pre-authorizes a return of the qualified products from the first location to the second location.

* * * * *